United States Patent
Berkman et al.

(10) Patent No.: US 7,892,502 B2
(45) Date of Patent: Feb. 22, 2011

(54) OZONE SYSTEM FOR MULTI-CHAMBER TOOLS

(75) Inventors: Vitaly J. Berkman, Brookline, MA (US); Thomas J. Ryan, Medford, MA (US)

(73) Assignee: MKS Instruments, Inc., Andover, MA (US)

( * ) Notice: Subject to any disclaimer, the term of this patent is extended or adjusted under 35 U.S.C. 154(b) by 1225 days.

(21) Appl. No.: 11/482,508

(22) Filed: Jul. 7, 2006

(65) Prior Publication Data

US 2007/0020160 A1 Jan. 25, 2007

Related U.S. Application Data

(60) Provisional application No. 60/697,802, filed on Jul. 7, 2005.

(51) Int. Cl.
*B01J 19/08* (2006.01)
(52) U.S. Cl. .............................. 422/186.12; 422/186.07
(58) Field of Classification Search ............ 422/186.07, 422/186.12
See application file for complete search history.

(56) References Cited

U.S. PATENT DOCUMENTS

| | | | |
|---|---|---|---|
| 3,549,528 A | 12/1970 | Armstrong | 210/60 |
| 3,763,877 A | 10/1973 | Lieb | 137/117 |
| 4,379,402 A | 4/1983 | Harman | 73/23 |
| 5,069,880 A | 12/1991 | Karlson et al. | 422/186.19 |
| 5,106,589 A | 4/1992 | Conrad et al. | 422/186.15 |
| 5,133,946 A | 7/1992 | Schwarzl | 422/186.12 |
| 5,151,250 A | 9/1992 | Conrad | 422/2 |
| 5,332,555 A | 7/1994 | Hosokawa | 422/186.05 |
| 5,364,505 A | 11/1994 | Funk | 162/238 |
| 5,370,846 A | 12/1994 | Yokomi et al. | 422/186.07 |
| 5,540,898 A * | 7/1996 | Davidson | 422/186.15 |
| 5,888,271 A | 3/1999 | Tanimura | 95/12 |
| 5,904,170 A | 5/1999 | Harvey | 137/9 |
| 6,054,102 A | 4/2000 | Tanimura et al. | 422/186.15 |
| 2004/0002224 A1 | 1/2004 | Chono et al. | 438/714 |
| 2004/0069226 A1 | 4/2004 | Yoshida et al. | 118/715 |

* cited by examiner

*Primary Examiner*—Kishor Mayekar
(74) *Attorney, Agent, or Firm*—Proskauer Rose LLP

(57) ABSTRACT

An improved system and method for controlling ozone concentration in connection with a multi-chamber tool. The system and method involve a first and a second concentration controller in combination with an ozone generator. The first concentration controller detects an EVENT (i.e., one of the chambers in the multi-chamber tool coming on-line or off-line) and in response provides a power instruction to the ozone generator in accordance with a predictive control algorithm. The first concentration controller has a fast (i.e, about 1 second) response time. The second concentration controller is masked from the ozone generator during the EVENT, but otherwise controls the generator after an interval of time has lapsed after the EVENT. The second concentration controller has a slower response time than the first concentration controller, however the second concentration controller provides the system with long-term stability and can be used to provide updated data to the predictive control algorithm.

12 Claims, 7 Drawing Sheets

OZONE SYSTEM FOR MULTI-CHAMBER TOOLS

RELATED APPLICATIONS

This application claims the benefit of U.S. Provisional Application Ser. No. (U.S. Ser. No.) 60/697,802, entitled "Ozone System for Multi-Chamber Tools," filed on Jul. 7, 2005. The entire disclosure of U.S. Ser. No. 60/697,802 is incorporated herein by reference.

FIELD OF THE INVENTION

The invention relates generally to dilute gas delivery systems, such as, for example ozone delivery systems. In particular, the invention relates to maintaining a concentration of a delivered gas at a desired level in a dilute gas delivery system for multi-chamber tools.

BACKGROUND

Ozone can be used in various semiconductor processing systems. For example, ozone can be used in the formation of insulating layers on semiconductor wafers by growing insulating films or by oxidizing thin films on the wafer. Ozone can be used for surface conditioning of a semiconductor wafer prior to deposition of device elements. Another application for ozone in semiconductor processing is for cleaning semiconductor wafers and the processing chambers of semiconductor equipment. Ozone is particularly useful for removing hydrocarbons from the surface of semiconductor wafers or from processing chambers.

The use of ozone in semiconductor processing has imposed increased demands on ozone generating equipment. For semiconductor processing applications, ozone, as well as other gases delivered to a processing chamber, must be very pure so that the delivered gas does not introduce contaminants into the process. Some ozone generators require the use of inert dopant gases, such as for example, nitrogen or carbon dioxide, to increase the ozone concentration to acceptable levels.

In general, to increase productivity, a semiconductor processing tool can utilize multiple chambers. While it would be advantageous to use a single ozone generator to feed ozone to more than one chamber of a tool to decrease equipment and operating costs, conventional systems use a dedicated ozone generator for each processing chamber due to difficulties that arise during initiation or discontinuation of a chamber. For example, large increases or decreases from a desired concentration level in semiconductor processing over a time interval of 20 seconds or greater can have disastrous effects on semiconductor device quality. When one ozone generator is used to service multiple chambers, the conventional control systems in general have a reaction or settling time of 30 seconds or greater. See, for example, FIG. 1, showing a typical response time for a PID controller, wherein the settling time is about 70 seconds to achieve a desired 300 g/m$^3$ concentration for a 10 slm flow rate. As a result, concentration levels in the chambers during the 30-second settling time differ from the desired level, thereby leading to a compromised semiconductor product.

SUMMARY OF THE INVENTION

In general, the invention features methods and systems to maintain a substantially constant concentration of a gas, such as ozone, delivered to one or more chambers of a processing tool when flow to a chamber is initiated or discontinued. Bringing a chamber online or discontinuing flow to a chamber is referred to as an EVENT. Thus, in a system including a multi-chamber tool, an EVENT occurs (1) when a chamber is activated or (2) when flow to a chamber is discontinued. Ozone is used herein as a representative species, although other gases, or the production of other dilute gases, can be controlled using the methods and systems described herein. In various embodiments, the methods and systems of the invention can simplify system design, reduce capital equipment costs, increase reliability and quality of a produced product, improve dynamic response and accuracy in maintaining an ozone concentration, reduce the consumption of oxygen, and minimize excess production of ozone.

In one aspect, the invention is directed to a system for controlling flow and concentration of ozone. The system includes an ozone generator, a flow sensor, a first controller, a concentration sensor, and a second controller. The ozone generator of the system includes an adjustable gas input connectable to a gas source (such as, for example, oxygen or a combination of oxygen and a dopant gas), an adjustable power input, and a gas output connectable to a plurality of processing chambers. Each of the plurality of processing chambers is set to allow a predetermined flow rate through when the chamber is activated. The flow sensor of the system is used to measure a total flow rate through the plurality of processing chambers. The first controller is in communication with the flow sensor and the ozone generator. The first controller is used to determine an occurrence of an EVENT by comparing the total flow rate to the predetermined flow rate. The first controller then adjusts the adjustable power input of the ozone generator in accordance with data stored in a look-up table upon the occurrence of the EVENT. The concentration sensor is used to measure a concentration level of ozone in the gas output of the ozone generator. The second controller is in communication with the concentration sensor and the ozone generator. The second controller is used for adjusting the adjustable power input at a given time after the occurrence of the EVENT.

As a result of using the first and second controllers, the system in one embodiment of the invention is able to deliver ozone at a desired level to multiple chambers during and after the occurrence of one or more EVENT(S). In practice, the first controller is able to detect the EVENT occurrence and is able to supply the ozone generator with instructions to increase or decrease the power according to a value stored in a look-up table. These instructions are supplied to the ozone generator almost immediately after the detection of an EVENT, such that an ozone generator having a 9 second settling time can used to deliver the appropriate concentration to one or more chambers after the detection of an EVENT in about 10 seconds. The second controller of the invention is provided to constantly update data in the look-up table and to maintain the desired concentration value after the EVENT. In general the second controller is a PID controller that can provide a more accurate and more stable control of the concentration of the ozone over time than a simpler algorithm controller, like the first controller. However, the second controller has a longer settling time, on the order of 30 seconds or so, and as a result is masked from the system during a EVENT occurrence so that the first controller can provide the needed fast change in processing conditions.

This aspect of the invention can include one or more of the following features. In one embodiment of the system, the given time after the occurrence of the EVENT at which the second controller is used for adjusting the adjustable power input is equal to or greater than a settling time of the second controller (e.g., a PID controller). In certain embodiments, the second controller updates data stored in the look-up table to reflect the current operating conditions of the ozone generator. The system can also include a closed-loop pressure controller connected to the ozone generator to help avoid extreme flow fluctuations when the chambers are cycled. In some embodiments of this aspect of the invention, the adjustable gas input includes at least one mass flow controller. In other embodiments, the adjustable gas input includes at least one mass flow meter. The adjustable gas input may also include a ratio control device for controlling a concentration ratio between an oxygen source gas and a dopant carrier gas. In certain embodiments, the first controller of the system has a read range than is greater than 50 percent of the predetermined flow rate. That is, the first controller can detect an EVENT upon seeing an increase or decrease in total flow rate by a value that is greater than 50% of a predetermined flow rate for a single chamber.

In another aspect, the invention is directed to a method of controlling flow and concentration of a diluted gas, such as, for example, ozone formed by reaction of oxygen in an ozone generator, or a gaseous mixture of argon/nitrogen through dissociation using a remote plasma source. The method includes (a) introducing a flow of the diluted gas to a first chamber at a concentration; (b) introducing the flow of the diluted gas to a second chamber; and (c) using a predetermined value to adjust production of the diluted gas such that the concentration of the diluted gas in the first chamber remains substantially unchanged and the second chamber receives a concentration of the diluted gas substantially the same as the concentration delivered to the first chamber after an interval of time, the interval of time being less than about 15 seconds. In some embodiments the interval of time is less than about 10 seconds.

In certain embodiments of this aspect of the invention, the predetermined value is determined using a predictive control algorithm. For example, when this method is used to control ozone production from an ozone generator, the predictive control algorithm can include utilizing a look-up table of known power setting that correspond to a desired ozone flow rate for a particular concentration of ozone.

In another aspect, the invention features a method of controlling a flow and concentration of ozone. The method includes (a) introducing a flow of ozone to a first chamber at a concentration; (b) introducing the flow of ozone to a second chamber; (c) adjusting a power level delivered to an ozone generator to change a rate of production of ozone to maintain a concentration of ozone in the second chamber at a value substantially the same as the concentration of ozone in the first chamber after an interval of time; (d) storing in memory the power level delivered; and (e) using the power level as a reference during a subsequent adjustment. In some embodiments, once a concentration level is stabilized, a system controller stores the value of the power delivered in its memory to provide a self-learned reference for subsequent cycles of gas flow changes. This feature allows the method to compensate for any changes in ozone generator performance over its lifetime. For example, ozone generator performance can vary due to inconsistencies in cooling, power fluctuation, system warm-up, and overtime degradation of the ozone generator. As a result, by incorporating a controller, which can update values stored in the look-up table based upon recent performance of the ozone generator, the system can compensate for changes in the ozone generator's performance.

In another aspect, the invention features a method of controlling a flow and concentration of ozone in a system including a plurality of processing chambers. The method includes (a) using a predictive control algorithm to control production of ozone in an ozone generator during an occurrence of an EVENT; (b) using a PID controller to control production of ozone in an ozone generator after the occurrence of the EVENT and to update data used in the predictive control algorithm. In this aspect of the invention, the predictive control algorithm includes (a) determining an activation event of one of the plurality of chambers from a measurement of total flow of ozone; (b) selecting a power output setting that corresponds to the activation event; and (c) adjusting power in an ozone generator to the selected power output setting.

In another aspect, the invention features a system for controlling the flow and concentration of ozone produced in an ozone generator. The system includes an adjustable gas input, an adjustable power input, a flow sensor, a first controller, a concentration sensor and a second controller. The adjustable gas input is connectable to a gas source. The adjustable power input is used for regulating a concentration of ozone produced for use in a plurality of processing chambers. Each of the plurality of processing chambers allows a predetermined flow rate through into the chamber when activated. The flow sensor is used to measure a total flow rate through the plurality of processing chambers. The first controller is in communication with the flow sensor and the adjustable power input. The first controller determines an occurrence of an EVENT by comparing the total flow rate to the predetermined flow rate and adjusts the adjustable power input in accordance with data stored in a look-up table upon the occurrence of the EVENT. The concentration sensor is used to measure a concentration level of ozone produced. The second controller is in communication with the concentration sensor and the adjustable power input. The second controller adjusts the adjustable power input at a given time after the occurrence of the EVENT. In some embodiments, the given time after the occurrence of the EVENT is equal to or greater than the settling time of the second controller. In certain embodiments, the given time after the occurrence of the EVENT is about 5 to 15 seconds after the occurrence of the EVENT.

BRIEF DESCRIPTION OF THE DRAWINGS

In the drawings, like reference characters generally refer to the same parts throughout the different views. Also, the drawings are not necessarily to scale, emphasis instead being placed upon illustrating the principles of the invention.

DETAILED DESCRIPTION

Figure 1:
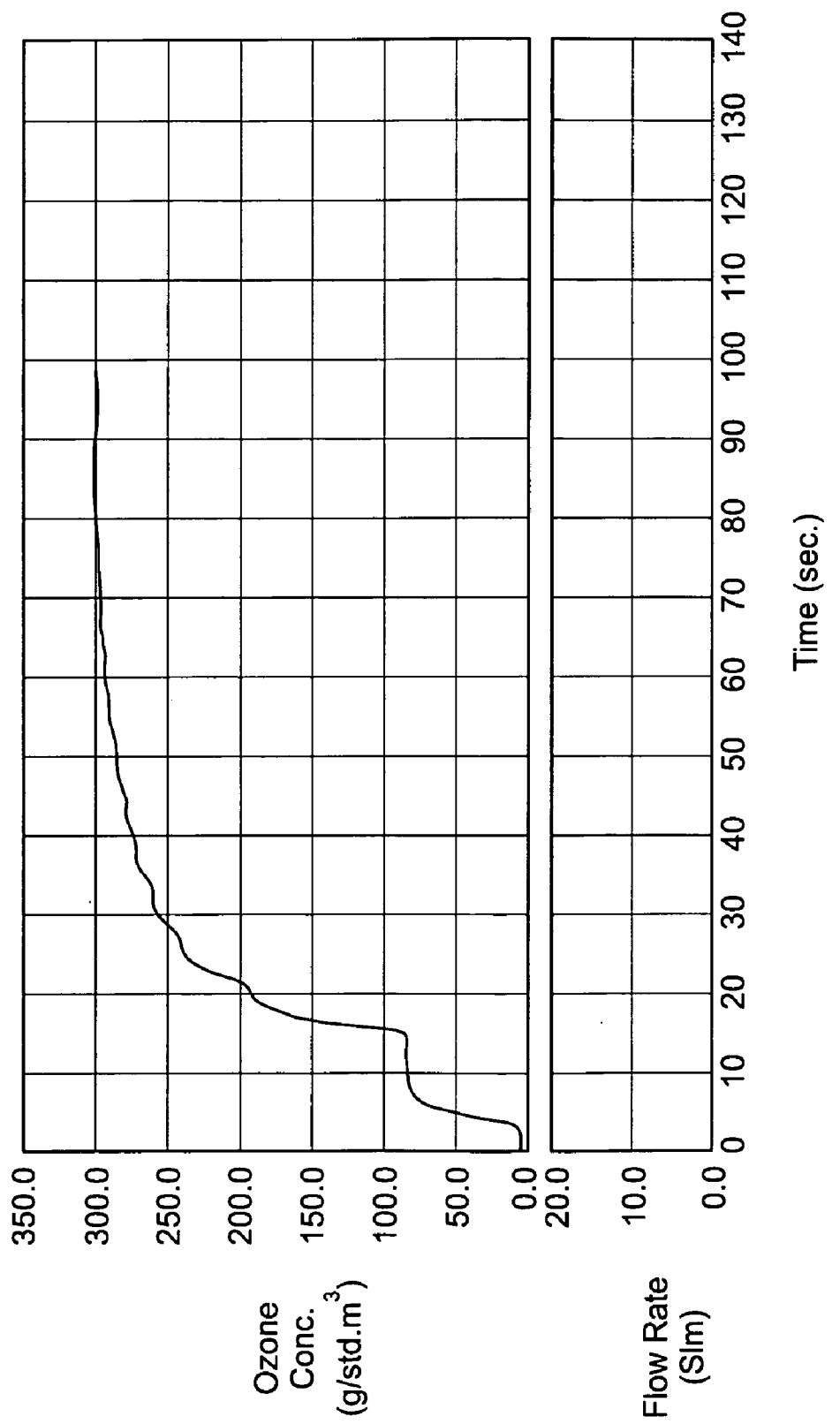
FIG. 1 is a graph of ozone concentration versus time for a standard PID controller.
Figure 2:
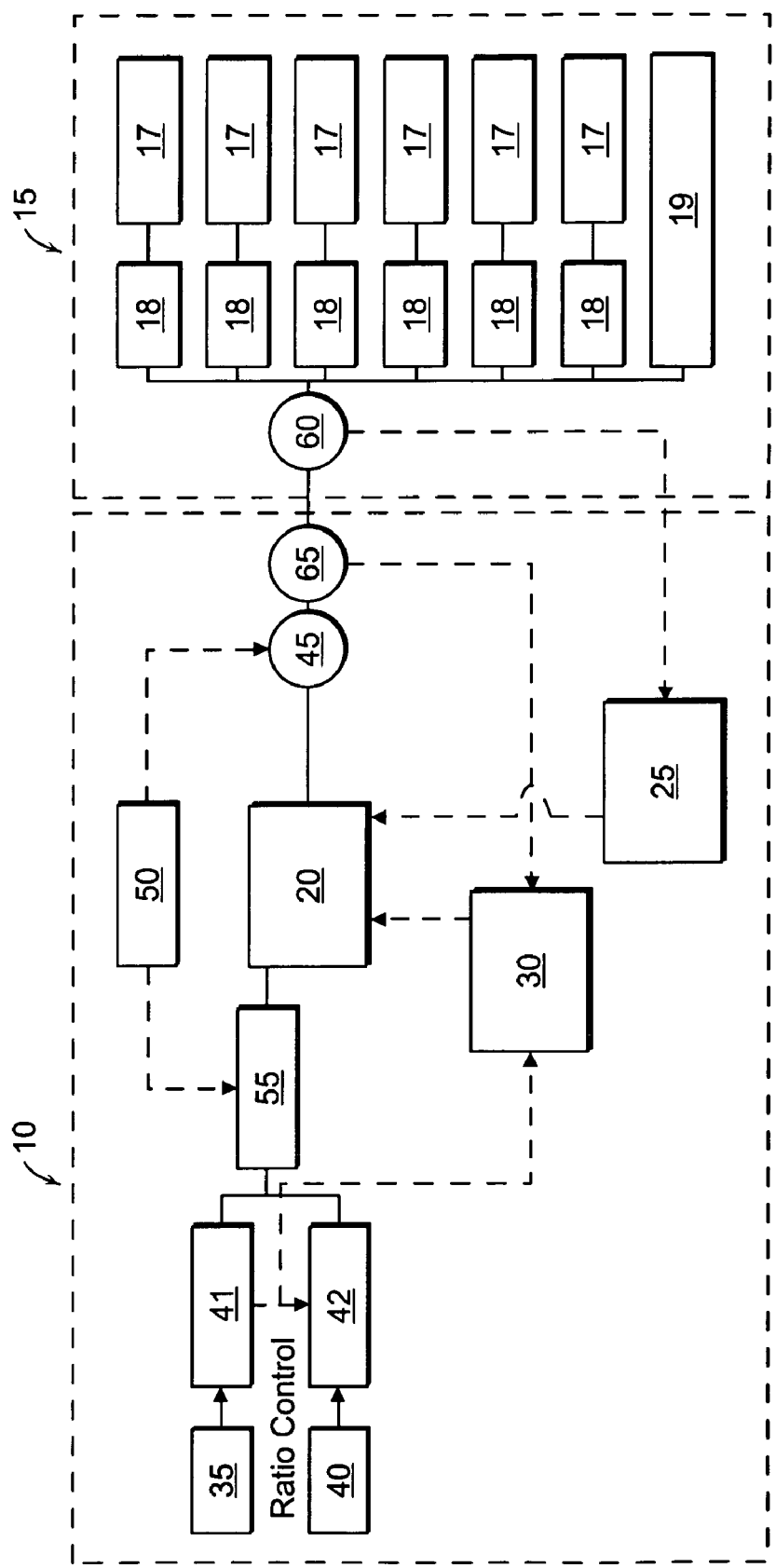
FIG. 2 is a block diagram illustrating a system for controlling flow of ozone in accordance to an embodiment of the invention. The system is shown connected with source gas and with a multi-chambered processing tool.

FIG. 2 shows an exemplary ozone delivery system 10 used in connection with a multi-chamber semiconductor processing tool 15. The multi-chamber processing tool 15, shown includes six chambers 17 each in fluid connection with a dedicated flow controller 18; however any number of chambers (e.g., 2, 3, 4, 5, 7, etc) can be included in the multi-chamber tool 15. The multi-chamber processing tool 15 can also include an ozone destruction unit 19, which can be opened to accept ozone during non-processing intervals, such as, for example, during warm up or shut down of the delivery system 10.

The ozone delivery system 10 includes an ozone generator 20 with a first concentration controller 25 and a second concentration controller 30. The first and second concentration controllers 25 and 30 provide the ozone delivery system 10 with the ability to maintain a desired ozone concentration in the multiple chambers 17 during and after the activation and discontinuation of ozone flowing into chambers of the tool 15. As a result of using the combination of the first controller 25 and the second controller 30, high quality semiconductor product can be processed within the multi-chambered processing tool 15 without the use of a dedicated ozone generator for each of the six chambers 17.

In certain embodiments, the ozone generator 20 used in the delivery system 10 is an AX8550 ozone generator available from MKS Instruments, Inc, (Wilmington, Mass.). In other embodiments, the ozone generator 20 is a SEMOZON® AX8400 series ozone generator available from MKS Instruments, Inc. with a choice of a common or independent, dual-channel gas flow control. In addition, in certain embodiments, not shown, the ozone delivery system 10 includes two or more ozone generators 20 working together to generate in-situ ozone gas. The ozone delivery system 10 of the invention can include one or more ozone generators 20 so long as the ozone generators 20 deliver gas to more than one chamber 17 of the attached multi-chamber tool 15. That is, the ozone delivery system 10 does not include a dedicated ozone generator for each chamber 17 of an attached multi-chamber semiconductor processing tool 15.

In general, ozone can be produced in an ozone generator 20 using a silent electrical discharge process. Briefly, the silent electrical discharge process involves exposing high purity oxygen gas, with or without a small amount of a dopant gas, to an electrical discharge. The discharge excites the oxygen molecules, breaking them into their atomic state. The atoms recombine into a mixture of ozone ($O_3$) and oxygen ($O_2$)—a diluted gas. The ratio of ozone to oxygen depends on the quantity of oxygen used in combination with an amount of power delivered to the generator to create the electrical discharge. As a result, the ozone generator 30 allows for an adjustable input of both gases and power so as to be able to vary and control ozone production. In general, known ozone generators can produce ozone concentrations of up to about 25 weight percent and flow rates of up to 50 standard liters per minute (slm) can be achieved.

Referring to FIG. 2, the delivery system 10 is connected to gas sources 35 and 40 through flow controllers 41 and 42. The flow controllers can be either mass flow controllers or alternatively, mass flow meters. Gas source 35 delivers high purity oxygen to the ozone generator 20. Gas source 40 is used to deliver a dopant, such as nitrogen or carbon dioxide to the ozone generator 20. However, in some embodiments, gas source 40 and corresponding flow controller 42 are eliminated so that no dopant gas is used during ozone production. In certain embodiments, the oxygen gas and/or the dopant gas can be introduced into the ozone generator via a pressure controller, such as a 640 pressure controller available from MKS Instruments, Inc. (Wilmington, Mass.).

Output from the ozone generator 20 can be directed to a pressure sensor 45 that is in electrical communication with a pressure controller 50 designed to hold gas output from the ozone generator at a constant pressure. As a result of holding the gas output at a constant pressure, such as, for example, 20 to 30 psig, extreme flow fluctuations during an EVENT (i.e., the activation or discontinuation of one of the multiple chambers) are minimized. The pressure controller 50 is connected to a vacuum source 55, in which the impedance of the pressure controller 50 can be used to adjust a size of an opening of the vacuum 55 in fluid connection with an input to the ozone generator 20. Thus, the pressure of the delivered ozone produced in the ozone generator 20 is maintained by utilizing a closed-loop pressure control by variable impedance up stream of the generator as shown in FIG. 2. As a result of including the closed-loop pressure control system a back-pressure can be maintained to help avoid excessive fluctuations when a chamber is opened or closed. This allows for the use of simple and inexpensive flow control elements such as metering values and helps to minimize flow oscillations typical for higher-priced devices such as mass-flow controllers.

A flow sensor 60 can be used to provide feedback to the first concentration controller 25. The flow sensor 60 detects a total flow rate of ozone passing through each of the flow controllers 18 attached to a chamber 17. The total flow rate data is electronically sent to the first concentration controller 25, which uses this data to determine a total number of processing chambers 17 that are open at any given time. That is, the first concentration controller 25 utilizes the data to determine an occurrence of an EVENT (i.e., the activation or discontinuation of one of the chambers 17 of the multi-chamber tool 15). Upon detecting the occurrence of the EVENT, the first controller 25 using a predictive control algorithm determines an appropriate power setting for the ozone generator 20 by looking up a stored data setting corresponding to a desired ozone concentration for the total flow rate detected by the flow sensor 60. This power setting is immediately conveyed to the ozone generator 20, which typically has about a 9 second response time. As a result of conveying the data to the generator 20, ozone flow from the ozone generator has the desired concentration level within about 10 to 15 seconds.

The ozone delivery system 10 also includes a concentration sensor 65 that can be used to proved feedback to the second concentration controller 30. The concentration sensor 65 detects the concentration of the ozone in the flow of ozone leaving the ozone generator 20 (i.e., a gas output). The concentration data is electronically sent to the second concentration controller 30, which is a Proportional-Integral-Derivative (PID) controller or other type of controller that provides a more accurate and more stable control of the ozone concentration over time than a simpler algorithm controller, like the first controller 25. However, the second controller 30 has a longer settling time, on the order of 30 seconds or so, and as a result is masked from the system during an EVENT occurrence so that the first controller 25 can provide a quick change (i.e., a step change) in processing conditions. The second concentration controller 30 is masked from the ozone generator 20 during the EVENT up and until the second concentration controller 30 catches up to the power setting determined by the first concentration controller 25 using the predictive controller algorithm. Typically, the period of time the second concentration controller 30 is masked from the ozone generator 20 is approximately equal to a settling time of the second concentration controller 30 (e.g., about 30 seconds).

After the occurrence of the EVENT and the time period for the second concentration controller 30 to catch up with the first concentration controller 25, the second concentration 30 takes over control of the ozone generator 20 to provide more accurate and stable control of the concentration of ozone via feedback from concentration sensor 65. The second concentration controller 30 also provides updates to the data settings utilized by the first concentration controller 25 to provide a self-learning algorithm to the delivery system 10. Self-learning allows the system 10 to compensate for changes in performance of the ozone generator 20 over time. For example, in general ozone generators, such as the one used in the delivery system 10 degrade over time and require more power to produce the same concentration of ozone at a particular flow rate than when first new. In addition, changes to cooling conditions and long periods of use can also affect performance of the ozone generator. By including self-learning capabilities into the first concentration controller 25 through the use of the second concentration controller 30, the delivery system 10 is able to compensate for changes in the performance of the ozone generator 20.

In some embodiments, a ratio of molecular oxygen to dopant carrier gas can be controlled through a feedback loop with the second concentration controller 30. The second concentration controller 30 through the concentration sensor 65 detects the ozone concentration delivered from the ozone generator 20. If higher than desired levels of dopant are detected or lower than expected ozone concentration is detected, the second controller 30 electronically instructs one of the flow controllers 41 or 42 to increase or decrease their flow rate so as to change the ratio of oxygen to dopant carrier gas delivered to the ozone generator. As a result, the ozone generator 20 is provided with an adjustable gas input.

The power delivered to the ozone generator 20 is controlled using a predictive control algorithm, shown 100, which can change in response to a mass-flow change. The mass-flow change can be the result of introducing flow to an additional chamber 17, or as a result of discontinuing flow to a chamber 17. Changing ozone generator power can change the rate of production of ozone or other diluted gas such that concentration of ozone (or other diluted gas) provided to one or more chambers 17 of the multi-chamber tool 15 is maintained. In addition, the concentration of ozone between a first and a second chamber can be equalized in a fast and efficient process (e.g., under 15 seconds from bringing the second chamber on-line or off-line). As a result of using this method of controlling flow an increase in semiconductor tool throughput can be achieved due to the delivery system's 10 ability to quickly change step processing conditions.

Figure 3:
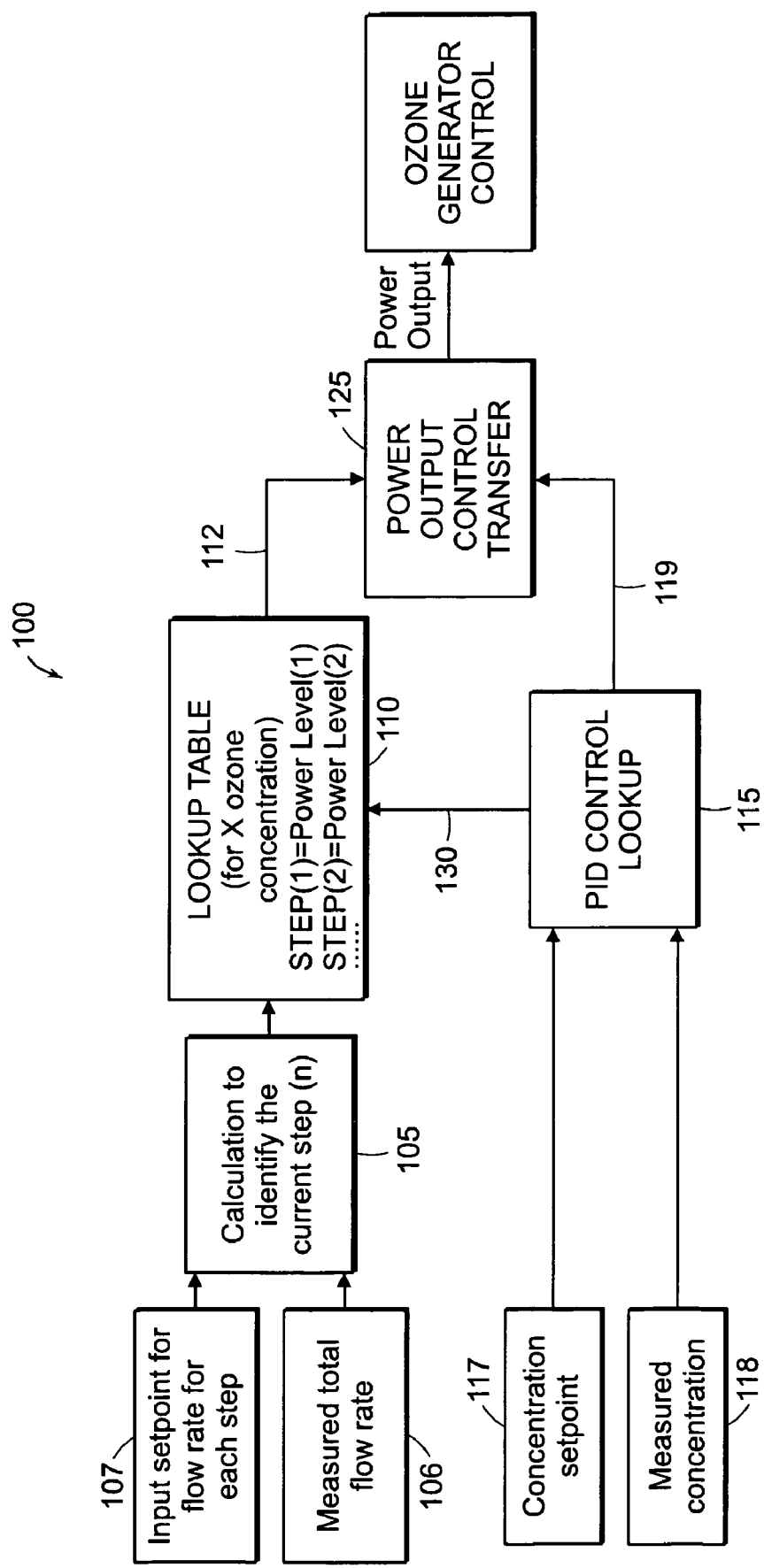
FIG. 3 is a block diagram illustrating a predictive control algorithm used in the system of FIG. 2.
Figure 4:
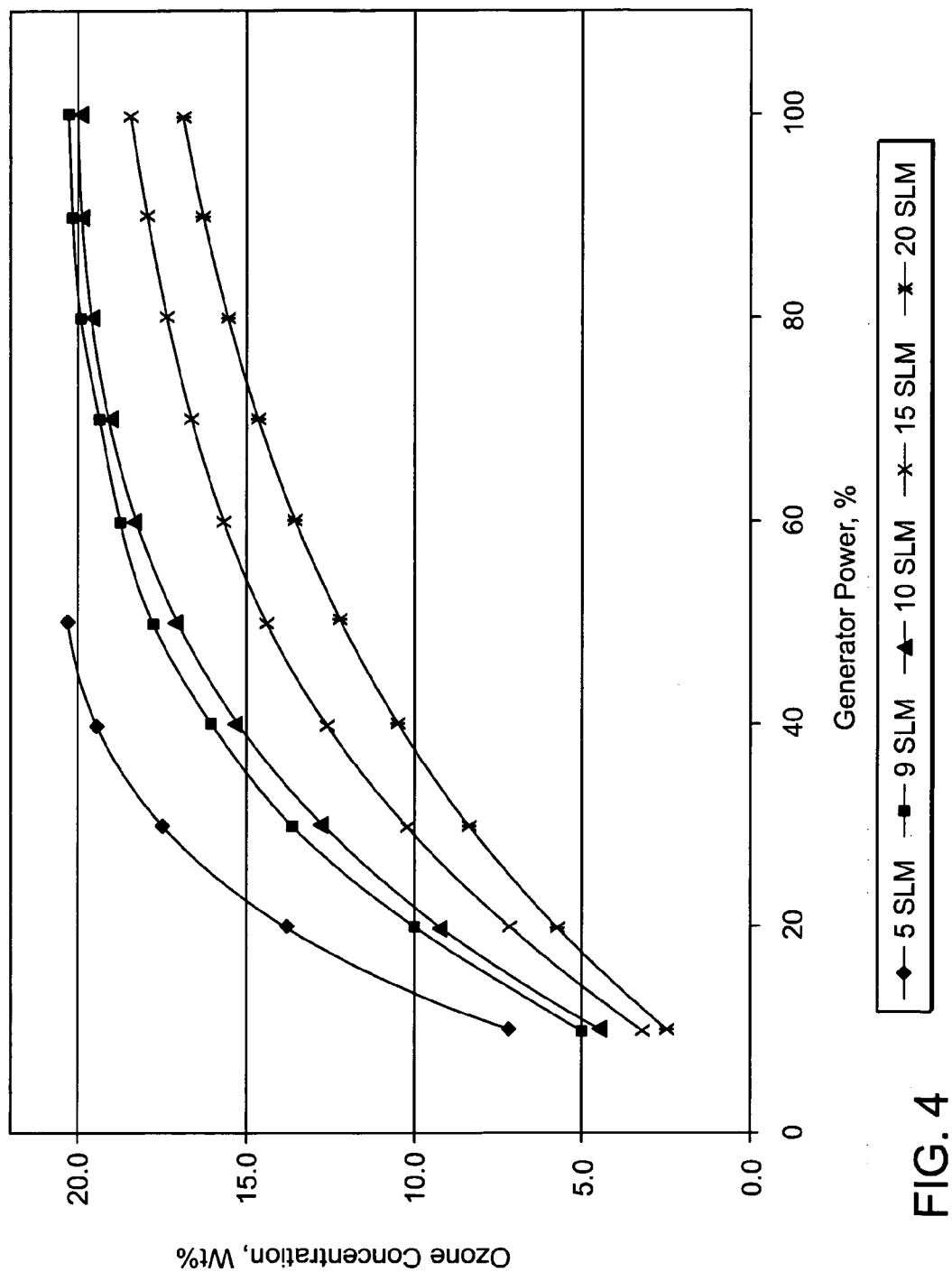
FIG. 4 is a graph of ozone concentration versus generator power of a typical ozone generator for various flow rates.

Referring to FIG. 3, the predictive control algorithm 100 includes a calculation to identify a current step (n) level, that is the number of chambers 17 currently in use. The calculation 105 is made within the first concentration controller 25 through a comparison of a total flow rate 106 as measured by the flow sensor 60 with a set point flow rate 107 set for each flow controller 18. That is, each flow controller 18 attached to one of the chambers 17 is set prior to use to a common flow rate set point (e.g., 5 slm). The calculation 105 is made by comparing or dividing the total flow rate 106 by the flow set point 107 to determine a current step (n) level. After determining the current step (n), the first concentration controller 25 determines the appropriate power level by consulting a look-up table 110. By entering the current step (i.e., number of chambers opened and thus the total flow required) the first controller 25 is able to retrieve a power setting that corresponds to the current step. For example, see FIG. 4 showing required generator power for achieving a desired ozone concentration for various flow rates. Data corresponding to results of the graph of FIG. 3 can be utilized to populate a look-up table for a specific ozone generator. Thus, as an example employing the data of FIG. 4, if the first concentration controller 25 calculates a current step of 3 for a process having a flow set point of 5 slm for each chamber 17 activated and a desired concentration level is 19 weight percent ozone in each chamber, the first controller 25 would find a power level value of about 40 percent in the look-up table. The first concentration controller 25 then transmit 112 a signal to adjust the power setting of the ozone generator.

The predictive control algorithm 100 also interacts with the second concentration controller 30. The second concentration controller 30 compares 115 concentration 117 as measured by the concentration sensor 65 to a desired concentration set point 118 (19 weight percent from the example given above). If the measured concentration is less than or greater than the desired concentration, then the second concentration controller sends 119 a signal to adjust the power setting of the ozone generator accordingly. However, since the settling time of second concentration controller 30 is greater than the first concentration controller 25, the power setting value according to the second concentration controller 30 will be delayed as compared to the first concentration controller 25 during a step change. As a result, the power setting transmitted from the second concentration controller 119 is masked through a power output control transfer algorithm 125. In general, during a step change the power output control algorithm prevents the transmission of the signal to adjust the power setting from the second concentration controller 30 until the power output signal sent 119 from the second concentration controller 30 is substantially equivalent to the power setting sent 112 from the first concentration controller 25. At that instant, the second concentration controller 30 takes over control of the ozone generator 20.

To compensate for change ozone generator power performance, the values stored in the look-up table 110 can be updated during use. For example, at some period of time after the second concentration controller 30 takes over power control 125 of the ozone generator 20, a new power value for that particular n-step can be stored, so that it can be used during a subsequent EVENT. The second concentration controller 30 due to its fine tuning capabilities can determine changes in the power performance of the ozone generator 20. As a result, the second concentration controller 30 can respond to these changes by adjusting the power settings accordingly. These adjusted power settings for a particular n-step are then transmitted 130 to the look-up table 130 for use during a subsequent step up or down to that particular n-level.

Figure 5:
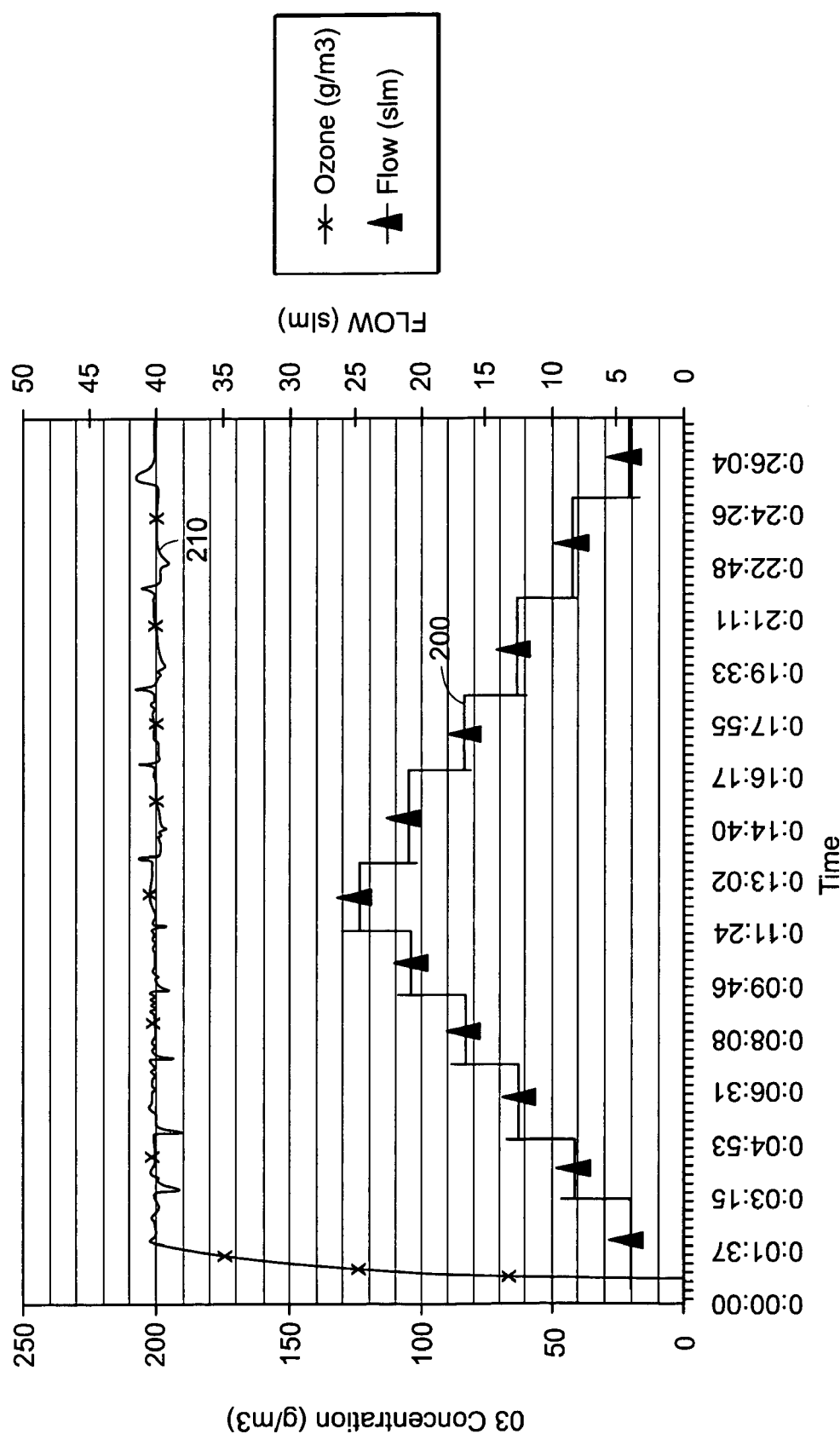
FIG. 5 is a graph of ozone concentration and ozone flow versus time as measured during use of the system shown in FIG. 2.

Referring to FIG. 5, shown is performance of the delivery system 10 to deliver ozone into the multi-chamber tool 15. The flow controllers 17 used in this example are metering valves, which have been pre-set to a flow rate of 4 slm. Each step up (i.e., each increase of 4 slm) in a graph of flow results 200 reflects bringing a chamber on-line, while each step down (i.e., each decrease of 4 slm) reflects discontinuing flow to a chamber. Each step represents a single EVENT. The first concentration controller 25 is able to distinguish each step from one another by dividing the total flow through the flow controllers 17 by the preset flow rate (e.g., 4 slm) to determine n, the number of chambers 17 activated at a given time. In certain embodiments, the first concentration controller 25 is able to detect the occurrence of an EVENT without waiting until the flow rate increases or decreases by a full n value. In fact the first concentration controller 25 can be set to detect an EVENT by seeing an increase or decrease equal to or greater than 50% of the preset flow rate per step. That is, for a preset flow rate of 4 slm, any change in flow rate greater than 2 slm will trigger the detection of an EVENT by the first concentration controller 25.

Figure 6:
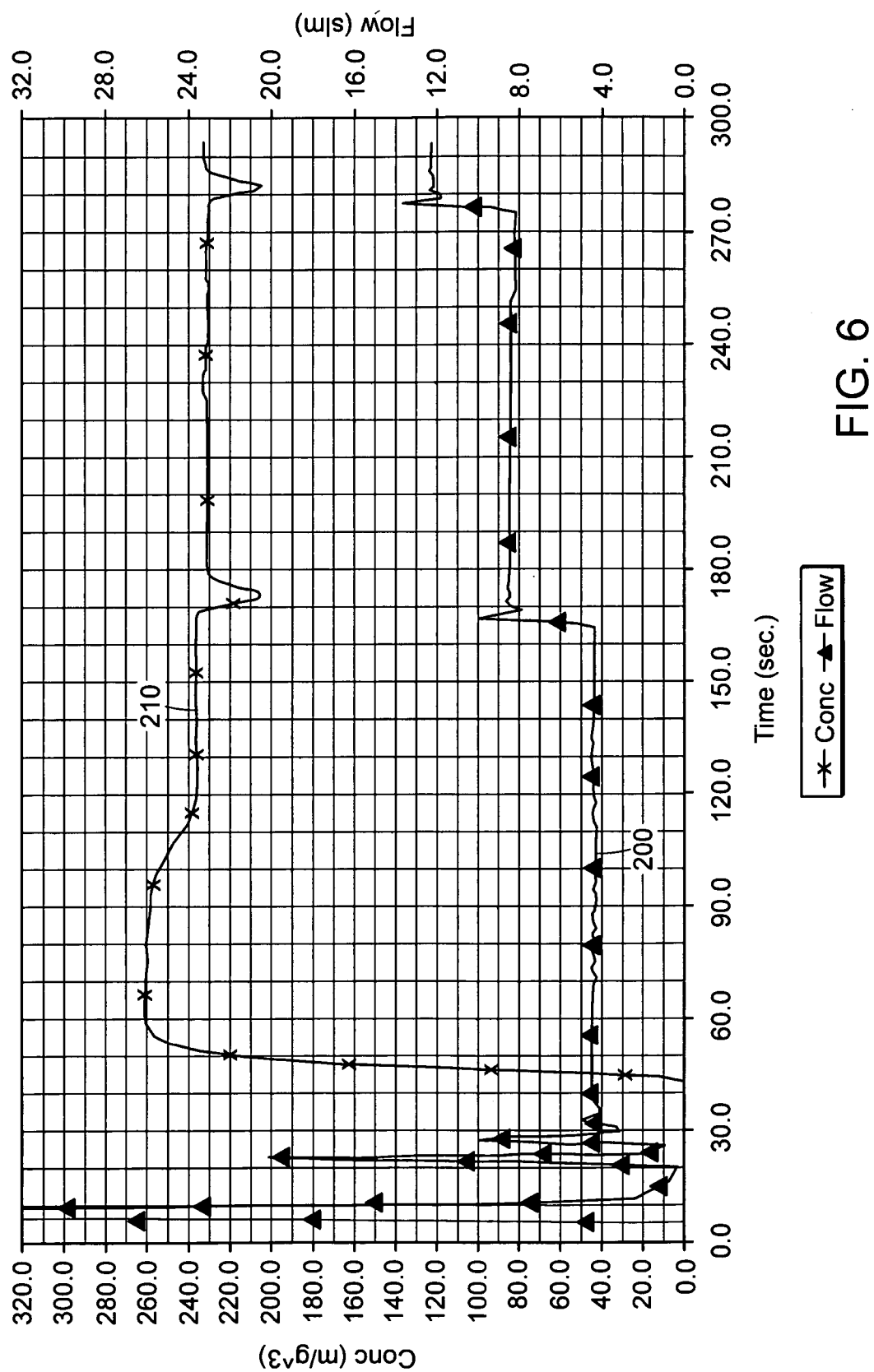
FIG. 6 is an enlarged portion of the graph of FIG. 5.

FIG. 5 also shows a graph of concentration results 210 that corresponds to the flow results 200. As illustrated by graph 210, the concentration of ozone remains substantially constant throughout the EVENT(s). The concentration stability is between about 1 and 10 g/m$^3$ upon each EVENT. Each spike or dip in concentration reflects the settling time upon an occurrence of the EVENT. In various embodiments of the invention, the settling time can be between 1 second and 15 seconds. In FIG. 6, which shows an enlarged view of the first 5 minutes of time represented in FIG. 5, the settling time is about 5 seconds. The settling time from a cold start up, i.e., initiating flow to the first chamber, can be between 15 seconds and about 100 seconds depending on previous usage of the ozone generator 20. In FIG. 6, the settling time from cold start up is about 90 seconds.

Figure 7:
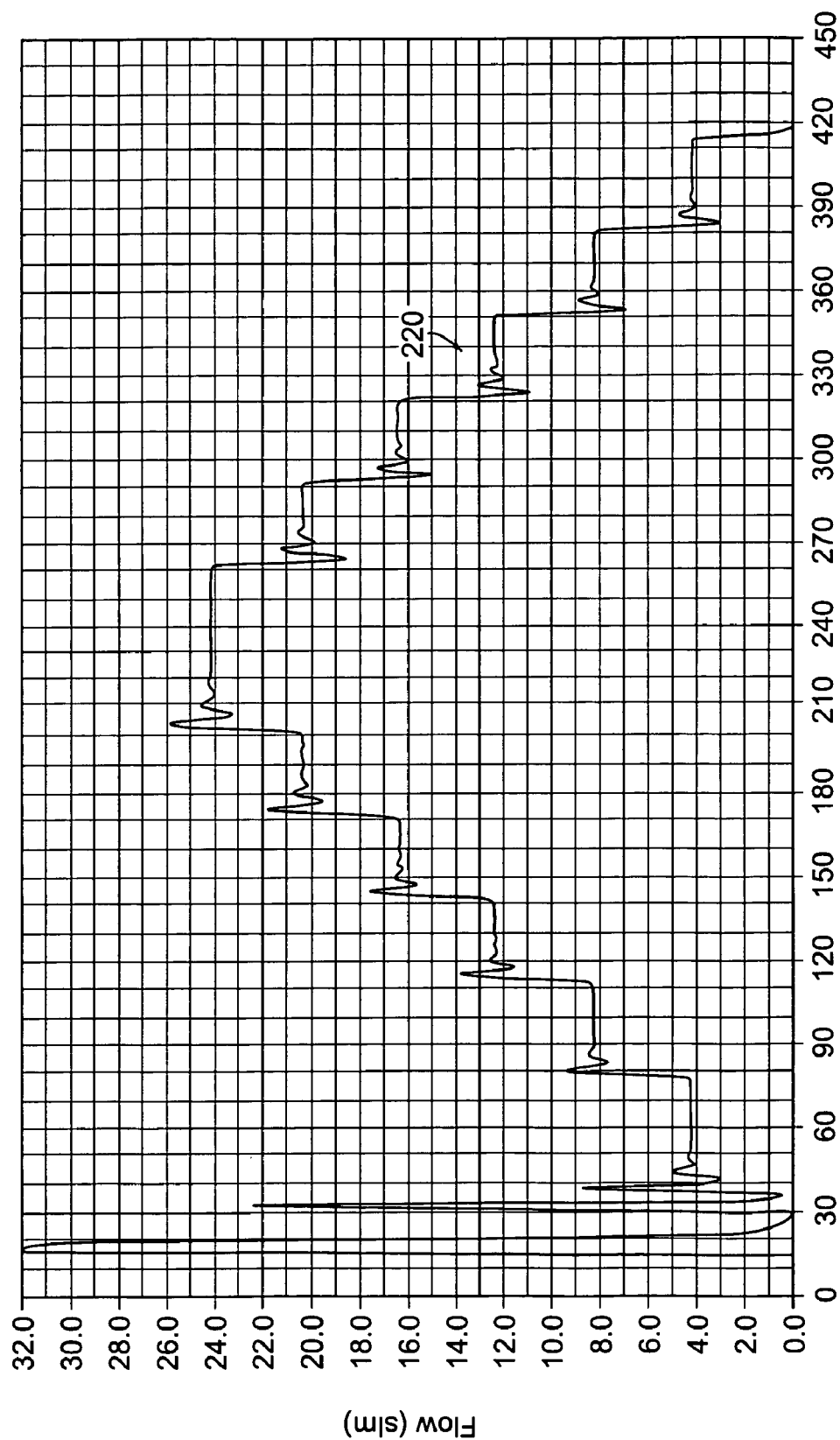
FIG. 7 is a graph of ozone flow versus time as measured for a system for controlling flow of ozone through a mass flow controller to a chamber of a multi-chamber tool.

Referring to FIG. 7, shown is performance of the delivery system 10 to deliver ozone into the multi-chamber tool 15 in accordance with another embodiment. The flow controllers 17 used in this embodiment are mass flow controllers, which have been pre-set to a flow rate of 4 slm. Unlike metering valves described in the embodiment above, mass flow controllers have an associated settling time of their own. As a result, the mass flow controllers 17 increase the amount of settling time per EVENT. Specifically, the settling time 220 shown in FIG. 7 is about 10 seconds as compared to the 5 second settling time in FIG. 6.

While the invention has been particularly shown and described with reference to specific embodiments, it should be understood by those skilled in the art that various changes in form and detail may be made therein without departing from the spirit and scope of the invention as defined by the claims. For example, while the methods and systems have been described in accordance with an embodiment which produces ozone, it is possible to use the system and methods of the invention with other types of dilute gas generation. For example, the systems and methods can be used to deliver a dissociated mixture of argon and nitrogen or argon and oxygen to the chambers. In addition, while the above embodiments described a look-up table that is pre-populated with data corresponding to known ozone generator characteristics, it is possible to provide a look-up table that initially includes zeros for all values. The look-up table including all zeros can be populated by the learning algorithm associated with the second concentration controller 30. That is, the zeros will be replaced by power values determined by the second concentration controller 30 after the delivery system has gone cycled through opening and closing all of the chambers 17.

What is claimed is:

1. A system for controlling the flow and concentration of ozone, the system comprising:
   an ozone generator including an adjustable gas input connectable to a gas source, an adjustable power input, and a gas output connectable to a plurality of processing chambers, each of the plurality of processing chambers is set to allow a predetermined flow rate therethrough when activated;
   a flow sensor used to measure a total flow rate through the plurality of processing chambers; a first controller in communication with the flow sensor and the ozone generator, the first controller for determining an occurrence of an EVENT by comparing the total flow rate to the predetermined flow rate and for adjusting the adjustable power input of the ozone generator in accordance with data stored in a look-up table upon the occurrence of the EVENT;
   a concentration sensor used to measure a concentration level of ozone in the gas output of the ozone generator; and
   a second controller in communication with the concentration sensor and the ozone generator, the second controller for adjusting the adjustable power input at a given time after the occurrence of the EVENT.

2. The system of claim 1, wherein the second controller is a Proportional-Integral-Derivative (PID) controller.

3. The system of claim 2, wherein the given time after the occurrence of the EVENT is equal to or greater than a settling time of the PID controller.

4. The system of claim 1, wherein the second controller updates data stored in the look-up table.

5. The system of claim 1 further comprising a closed-loop pressure controller connected to the ozone generator.

6. The system of claim 1, wherein the adjustable gas input comprises at least one mass flow controller.

7. The system of claim 1, wherein the adjustable gas input comprises at least one mass flow meter.

8. The system of claim 1, wherein the adjustable gas input comprises a ratio control device for controlling a concentration ratio between an oxygen source gas and a dopant carrier gas.

9. The system of claim 1, wherein the first controller has a read range than is greater than 50 percent of the predetermined flow rate.

10. A system for controlling the flow and concentration of ozone produced in an ozone generator, the system comprising:
    an adjustable gas input connectable to a gas source; an adjustable power input for regulating a concentration of ozone produced for use in a plurality of processing chambers, each of the plurality of processing chambers allowing a predetermined flow rate therethrough when activated;
    a flow sensor used to measure a total flow rate through the plurality of processing chambers;
    a first controller in communication with the flow sensor and the adjustable power input, the first controller determining an occurrence of an EVENT by comparing the total flow rate to the predetermined flow rate and adjusting the adjustable power input in accordance with data stored in a look-up table upon the occurrence of the EVENT;
    a concentration sensor used to measure a concentration level of ozone produced; and
    a second controller in communication with the concentration sensor and the adjustable power input, the second controller adjusting the adjustable power input at a given time after the occurrence of the EVENT.

11. The system of claim 10, wherein the given time after the occurrence of the EVENT is equal to or greater than a settling time of the second controller.

12. The system of claim 10, wherein the given time after the occurrence of the EVENT is about 5 to 15 seconds.

* * * * *